(12) United States Patent
Hodges

(10) Patent No.: US 11,297,816 B1
(45) Date of Patent: Apr. 12, 2022

(54) UNATTENDED FISHING RIG

(71) Applicant: Thomas E. Hodges, Farmington, AR (US)

(72) Inventor: Thomas E. Hodges, Farmington, AR (US)

( * ) Notice: Subject to any disclaimer, the term of this patent is extended or adjusted under 35 U.S.C. 154(b) by 154 days.

(21) Appl. No.: 16/742,980

(22) Filed: Jan. 15, 2020

(51) Int. Cl.
| | | |
|---|---|---|
| *A01K 97/11* | (2006.01) | |
| *F21V 33/00* | (2006.01) | |
| *F21V 23/00* | (2015.01) | |
| *F21V 23/04* | (2006.01) | |
| *F21V 23/02* | (2006.01) | |
| *F21V 31/00* | (2006.01) | |
| *H04B 1/38* | (2015.01) | |
| *F21V 17/10* | (2006.01) | |
| *H04W 88/02* | (2009.01) | |
| *F21Y 115/10* | (2016.01) | |
| *F21W 131/40* | (2006.01) | |
| *F21Y 103/10* | (2016.01) | |

(52) U.S. Cl.
CPC ............ *A01K 97/11* (2013.01); *F21V 17/101* (2013.01); *F21V 23/002* (2013.01); *F21V 23/02* (2013.01); *F21V 23/0464* (2013.01); *F21V 31/00* (2013.01); *F21V 33/008* (2013.01); *H04B 1/38* (2013.01); *F21W 2131/40* (2013.01); *F21Y 2103/10* (2016.08); *F21Y 2115/10* (2016.08); *H04W 88/02* (2013.01)

(58) Field of Classification Search
CPC ..... A01K 97/11; F21V 17/101; F21V 23/002; F21V 23/02; F21V 23/0464; F21V 31/00; F21V 33/008; H04B 1/38; F21Y 2103/10; F21Y 2115/10; F21W 2131/40; H04W 88/02

USPC .............................................................. 43/16
See application file for complete search history.

(56) References Cited

U.S. PATENT DOCUMENTS

| | | | |
|---|---|---|---|
| 4,434,573 A | | 3/1984 | Hodshire |
| 5,048,219 A | | 9/1991 | Georgescu |
| 5,613,318 A | * | 3/1997 | Hislop ................... A01K 97/11 43/16 |
| 6,763,629 B1 | | 7/2004 | Bennett |
| 8,196,335 B2 | | 6/2012 | Flecha |
| 8,739,458 B1 | | 6/2014 | Michael |

FOREIGN PATENT DOCUMENTS

| | | | | |
|---|---|---|---|---|
| CA | 2810890 A1 | * | 9/2013 | ............. A01K 97/01 |

OTHER PUBLICATIONS

Bobber Pulse with Fish Attractor Wireless Bluetooth Smart Fish Finder for iOS and Android Devices by ReelSonar. Product Listing [online]. © 1996-2020, Amazon.com, Inc. [retrieved on Jul. 25, 2019]. Retrieved from the Internet: <URL: https://www.amazon.com/ReelSonar-iBobber-Attractor-Wireless-Bluetooth/dp/B01N9CHF50>.

(Continued)

*Primary Examiner* — Andrew J Coughlin
*Assistant Examiner* — Jessica M Apenteng
(74) *Attorney, Agent, or Firm* — Cramer Patent & Design, PLLC; Aaron R. Cramer

(57) ABSTRACT

An unattended fishing rig includes a flotation device having a base frame member with a centrally positioned upright crossbar attached thereto. Disposed across the crossbar is a plurality of attachment points capable of supporting a fishing assembly. An anchor is secured to a tether which in turn is secured to the base of the fishing rig.

19 Claims, 5 Drawing Sheets

(56) References Cited

OTHER PUBLICATIONS

Smart Fishing Float Fish Bite Trigger Hook Automatically Electronic Trap intelligent Buoy LED Strike Alert Alarm Night Bobber. Product Listing [online], © 2010-2019 AliExpress.com. [retrieved on Jul. 25, 2019], Retrieved from the Internet: <URL: https://www.aliexpress.com/item/32860745523.html?storeId=3860087>.

"YoYo floats" Discussion in 'Fishing's by arkyduckboy. Post Thread [online]. © 2017 Carbon Media Group Outdoors. [posted on Jan. 31, 2012; retrieved on Jul. 25, 2019]. Retrieved from the Internet: <URL: https://www.arkansashunting.net/threads/yoyo-floats.121434/>.

"Any of you Baws Run Yo Yo's?" Discussion in Outdoor Board's by crap4brain. Post Thread [online]. © 2020 TigerDroppings.com. [posted on Feb. 5, 2018; Retrieved on Jul. 25, 2019], Retrieved from the Internet: <URL: https://www.tigerdroppings.com/rant/outdoor/any-of-you-baws-run-yo-yos-/75217910/page-3/>.

* cited by examiner

UNATTENDED FISHING RIG

RELATED APPLICATIONS

None.

FIELD OF THE INVENTION

The present invention relates generally to the field of fishing rigs and specifically to unattended fishing rigs.

BACKGROUND OF THE INVENTION

The yo-yo is an automatic fishing reel made of steel with a tempered spring that automatically sets the hook when the trigger is released by a fish taking the bait. These yo-yos are typically attached to limbs, boat docks, the side of a boat, or any other means that will suspend the reel a couple of inches above the water to allow for fishing in an unattended manner.

However, those who fish on a lake or pond, may not have such attachment points present. Additionally, it is very difficult to see if a fish has struck the bait on such a line, and hours could go by before the line is checked, resulting in lost opportunity to catch additional fish, or even eat the fish at an earlier time. While the fisherman could continuously check the yo-yos on a periodic basis, such time takes away from other activities such as spending time with family and friends who may be fishing or camping nearby. Such time is increased should more than one yo-yo be used at once.

Accordingly, there exists a need for a means by which unattended fishing using yo-yo's or similar lines can be enhanced to address the problems described herein. The development of the automated fishing device with reporting capabilities fulfills this need.

SUMMARY OF THE INVENTION

The inventor has recognized the aforementioned inherent problems and lack in the art and observed that there is a need for an automated fishing device which comprises a base frame which is provided with a plurality of floatation material, a pair of vertical supports which are attached to the base frame, a connecting top member which has a fitting, a plurality of pendant poles which are affixed to the midpoint of the connecting top member and an electronics enclosure having an antenna. The electronics enclosure may be mounted on the connecting top member and collects various operating parameters of the automated fishing device along with usage control. The antenna may transmit a first radio frequency signal to a central station. The central station then re-transmits the information via a second radio frequency signal to a personal transceiver held by a user.

The device also comprises a set of four attachment points which are provided at a distal end of each of the pendant poles with an additional attachment point located at the midpoint of the six-way connector. The attachment points are used to support one or more automated fishing automated assemblies. The device also comprises a tether which is provided to aid in securing the automated fishing device to a fixed point while in use. The tether is fastened to the fixed point to prevent the automated fishing device from getting lost.

The device also comprises a plurality of wiring which is connected to the electronics enclosure for recording the temperature of a body of water, a pair of sections of light strips which hare located on the bottom of the connecting top member and are electrically powered and controlled by the electronics enclosure, a wiring jumper which provides electrical power around the middle attachment point and a light sensor which senses a change of available light and is envisioned to activate the light strips. The change of available light is due to ambient conditions.

The floatation material may be a closed cell foam device while the pendant poles may be affixed with a six-way connector. There may be four pendant poles. The base frame, the pair of vertical supports, the connecting top member, and the pendant poles may be made of polyvinyl chloride. The central station may be a cellular telephone tower. The electronics enclosure may be provided with a bar code for initial programming or pairing with the personal transceiver. The electronics enclosure may house a battery, a single board computer, and a RF transceiver. The battery may be user replaceable or rechargeable. The single board computer may accept various inputs from up to five automated fishing assemblies and a temperature probe. The single board computer may provide an output to the light strips through the wiring jumper.

The RF transceiver may serve as both an input device and an output device for the single board computer. The inputs would be one or more signals to turn the light strips on and off, while the outputs would include one or more signals from the temperature probe and the automated fishing assemblies that would be passed back to the personal transceiver. Each of the automated fishing assemblies are baited with one or more fishing hooks or one or more bait. The one or more fishing hooks may be set at a different depth or a same depth within the body of water depending on the amount of fishing line that is deployed.

The one or more fishing hooks may be set at a different depth or a same depth within the body of water depending on the amount of fishing line that is deployed. The tether may be made of a polypropylene material that floats and is also lightweight and will not hinder natural movement of the automated fishing device. The light strips may be one or more LED-type light strips that are capable of adhesive bonding to the connecting top member. The one or more LED-type light strips may be waterproof. A smart phone application may be used with the automated fishing device. The smart phone application may include a set of five strike hit icons which indicate an active strike on the automated fishing assemblies.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
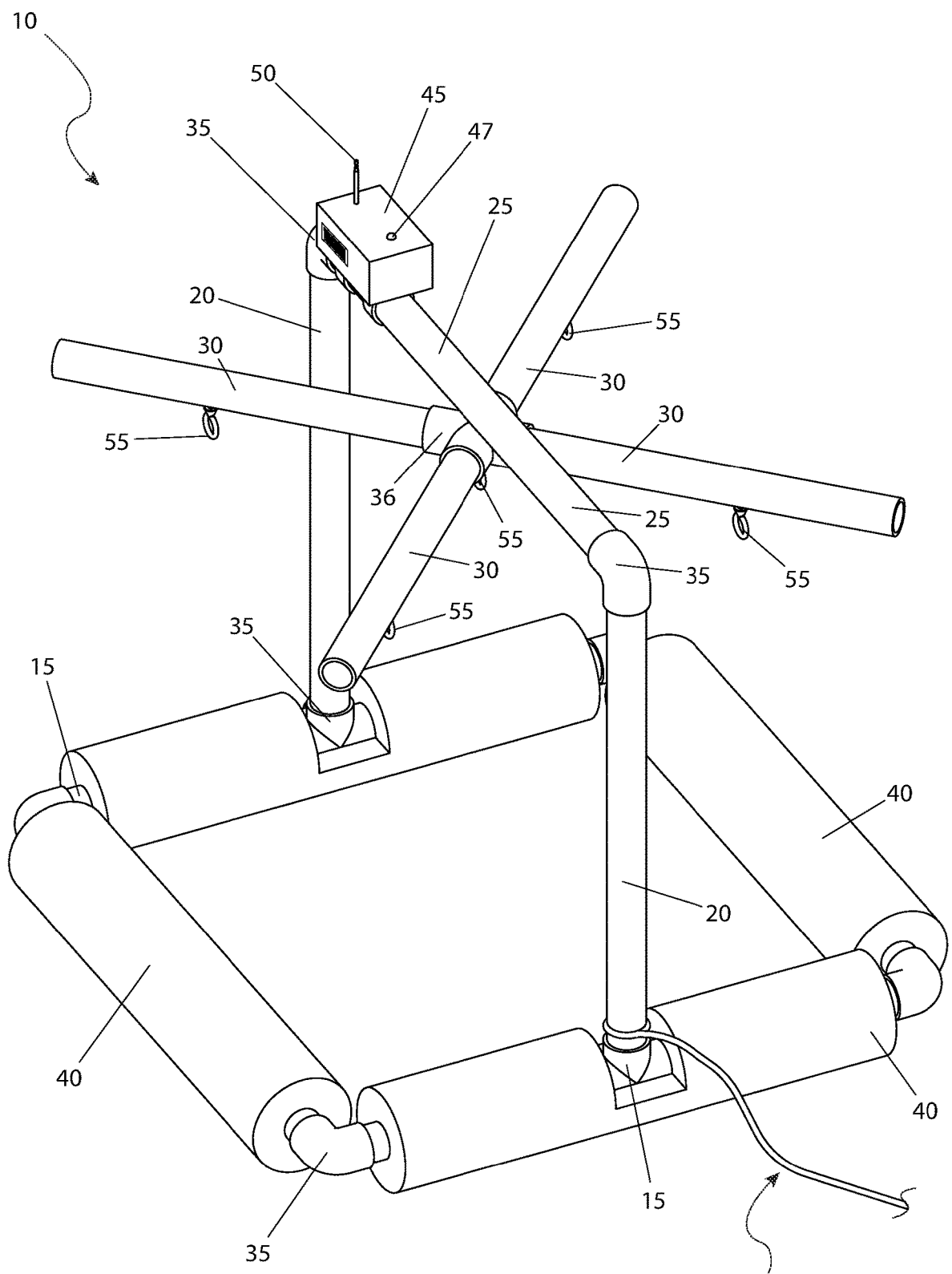
FIG. 1 is a perspective view of the automated fishing device 10, according to the preferred embodiment of the present invention.

DESCRIPTIVE KEY 10 automated fishing device
15 base frame
20 vertical support
25 connecting top member
30 pendant pole
35 first fitting
36 second fitting
40 flotation material
45 electronics enclosure
47 light sensor
50 antenna
55 attachment point
60 tether
65 body of water
70 fixed point
75 first radio frequency signal
80 central station
85 second radio frequency signal
90 personal transceiver
95 user
100 campsite
105 temperature probe
110 wiring
115 light strip
116 wiring jumper
120 bar code
125 fishing assembly
130 fishing hook
135 bait
140 fishing line
145 battery
150 single board computer (SBC)
155 RF transceiver
160 strike hit icon
165 light control button
170 temperature control readout
175 fish selection icon
180 depth selection icon
185 location selection icon
190 database read/write icon

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the automated fishing device 10, according to the preferred embodiment of the present invention is disclosed. The automated fishing device (herein also described as the "device") 10, includes a base frame 15, two (2) vertical supports 20, one (1) connecting top member 25 and four (4) pendant poles 30. The components are envisioned to be made of polyvinyl chloride (PVC) tubing joined together with various first fittings 35 and second fittings 36 such as elbows, tees, or other similar connectors. However, other materials of construction may also be utilized, and as such, the materials of construction as used in the present invention are not intended to be a limiting factor. In an exemplary embodiment, the vertical supports 20 are attached to the base frame 15 and the connecting top member 25 with a first fitting 35 such as an elbow. The pendant poles 30 are affixed to the midpoint of the connecting top member 20 with the second fitting 36, such as a six-way connector. The overall size of the device 10 may vary as per specific need, however, a typical size will be approximately eighteen inches (18 in.) wide, eighteen inches (18 in.) long, sixteen inches (16 in.) tall.

The base frame 15 is provided with flotation material 40, such as closed cell foam, to allow the device 10 to easily float on a body of water. An electronics enclosure 45 complete with antenna 50 is mounted on the connecting top member 25. Further description of the electronics enclosure 45 will be provided herein below. A set of four (4) attachment points 55 are provided at the distal end of each of the pendant poles 30, with an additional attachment point 55 located at the midpoint of the second fitting 26 for a total of five (5) attachment points 55. The attachment points 55 are used to support fishing assemblies 125 and will be described in greater detail herein below. A tether 60 is provided to aid in securing the device 10 to a fixed point while in use. Further details on the tether 60 will be provided herein below.

Figure 2:
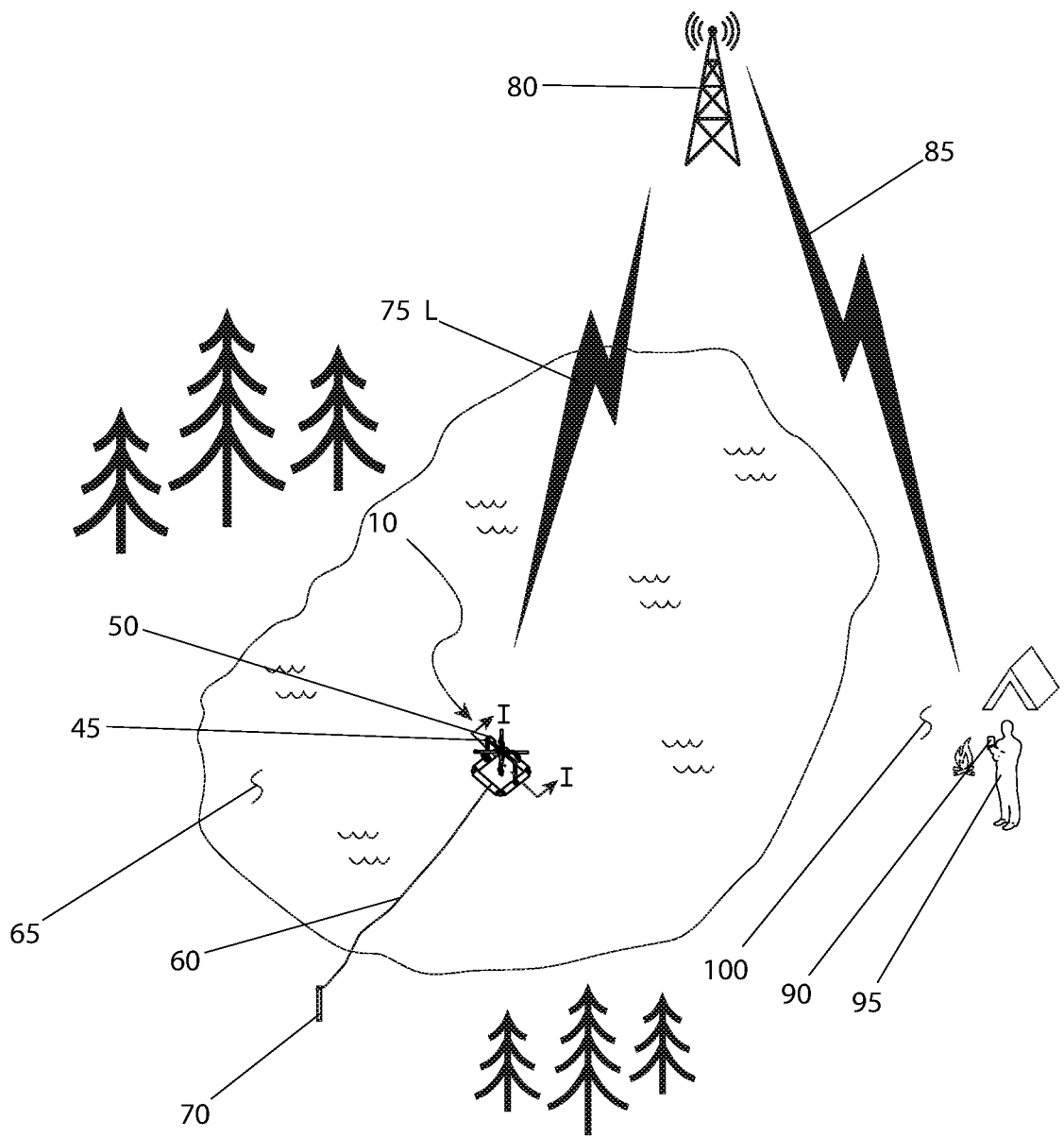
FIG. 2 is a perspective view of the automated fishing device 10, shown in a utilized state, according to the preferred embodiment of the present invention.

Referring next to FIG. 2, a perspective view of the device 10, shown in a utilized state, according to the preferred embodiment of the present invention is depicted. The device 10 is preferably deployed on a body of water 65, such as a lake, pond, stream, river, or the like. The tether 60 is fastened to a fixed point 70, such as a stake, tree, rock, or the like. The electronics enclosure 45 collects various operating parameters of the device 10 along with usage control and, through the antenna 50 transmits a first radio frequency signal 75 to a central station 80 such as dedicated radio repeater, a cellular telephone tower, or the like. In turn, the central station 80 then re-transmits said information via a second radio frequency signal 85 to a personal transceiver 90 held by a user 95. It is envisioned that the user 95 may be located at a campsite 100 (as shown), in a recreational vehicle (RV), on a boat, or any other similar location up to miles away as would be experienced and typical while on a personal fishing trip.

Figure 3:
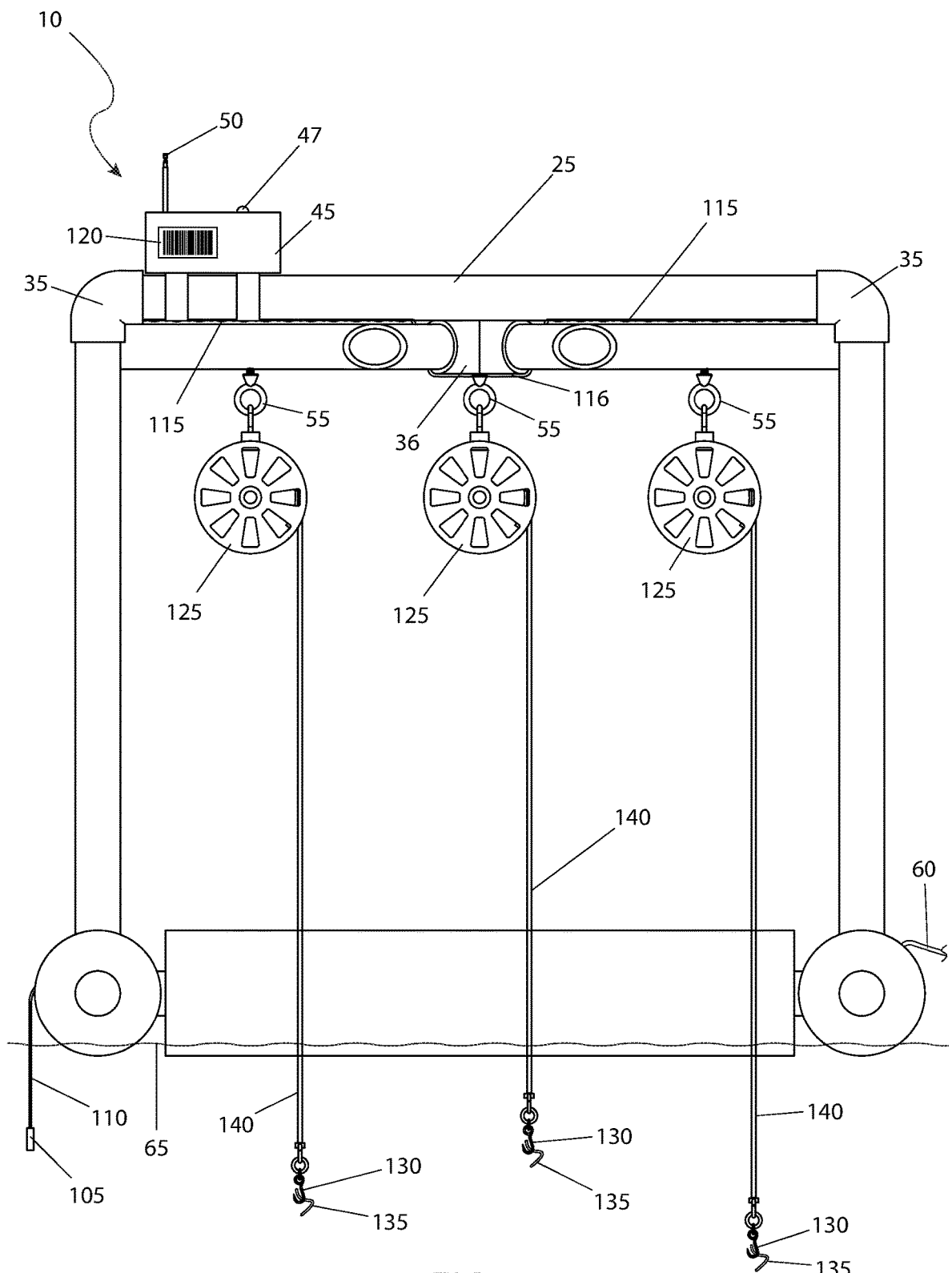
FIG. 3 is a sectional view of the automated fishing device 10, as seen along a line I-I, as shown in FIG. 2, according to the preferred embodiment of the present invention.

Referring now to FIG. 3, a sectional view of the device 10, as seen along a line I-I, as shown in FIG. 2, according to the preferred embodiment of the present invention is shown.

The device 10 is shown floating on the body of water 65 and secured via the tether 60. It is envisioned that the tether 60 would be manufactured of a material that floats such as polypropylene that is also lightweight and will not hinder natural movement of the device 10. A wiring 110 is connected via wiring 110 to the electronics enclosure 45 for purposes of recording the temperature of the body of water 65. Two (2) sections of light strips 115 are located on the bottom of the connecting top member 25 and are electrically powered and controlled by the electronics enclosure 45. In an exemplary embodiment, the light strips 115 are light-emitting diode (LED)-type light strips that are capable of adhesive bonding to the connecting top member 25 and are inherently waterproof A wiring jumper 116 is used to provide electrical power around the middle attachment point 55. The light strips 115 illuminate the surface of the body of water 65 as well as the surrounding area for access when baiting hooks or retrieving caught fish. The electronics enclosure 45 is also provided with a bar code 120 for initial programming (or pairing) with the personal transceiver 90 (as shown in FIG. 2). Such programming allows use of multiple device 10 in the same physical area, either all belonging to the same user 95 (as shown in FIG. 2) or different user 95. A light sensor 47 that senses the change of available light, typically due to ambient conditions such as shading or dawn or dusk, is envisioned to activate the light strips 115, although other embodiments provide for a maul switching of the light strips 115 and/or a timer that can be inputted by the user. Such a light sensor 47 is preferably located on an upper surface of the electronics enclosure 45.

Up to five (5) automated fishing assemblies 125 can be fastened to an individual attachment point, (only three (3) are shown here due to illustrative limitations). These automated fishing assemblies 125 such as "fishing yo-yo's" are well known in the art and whose internal workings are not included in the present scope of the device 10. The automated fishing assemblies 125 are baited with a fishing hook 130, bait 135 and other accessories as desired by the user 95. Each of the automated fishing assemblies 125 may be baited with different fishing hook 130 and/or bait 135 as well as the same, depending on the fish desired to be caught. Additionally, the fishing hook 130 may be set at different or the same depth within the body of water 65, depending on the amount of fishing line 140 that is deployed.

Figure 4:
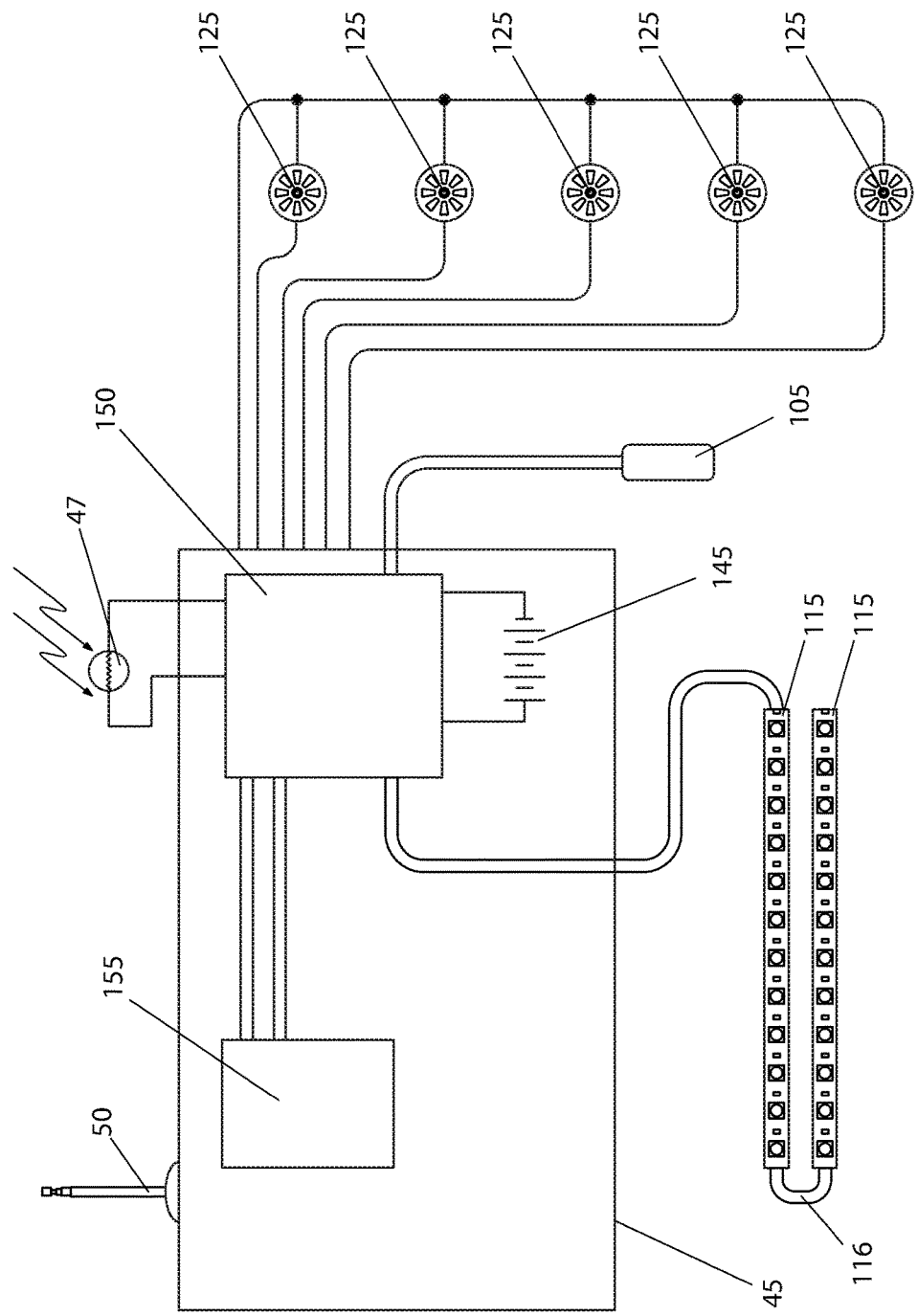
FIG. 4 is an electronic block diagram depicting the major electrical components of the automated fishing device 10, according to the preferred embodiment of the present invention.

Referring next to FIG. 4, an electronic block diagram depicting the major electrical components of the device 10, according to the preferred embodiment of the present invention is disclosed. The electronics enclosure 45 houses a battery 145, a single board computer (SBC) 150, and a RF transceiver 155. The battery 145 would be user replaceable and/or rechargeable. The single board computer (SBC) 150, such as a Raspberry Pi®, or an Arduino, accepts various inputs from up to five (5) automated fishing assemblies 125, (activation signals that indicate that a fish has struck the fishing line 140 (as shown in FIG. 3) and the temperature probe 105 (water temperature at time of fish strike). The single board computer (SBC) 150 provides an output to both light strips 115, through the wiring jumper 116. The RF transceiver 155 serves as both an input and output device for the single board computer (SBC) 150. Inputs would be signals to turn the light strips 115 on and off, while outputs would include signals from the temperature probe 105 and the automated fishing assemblies 125 that would be passed back to the personal transceiver 90 (as shown in FIG. 2) via the antenna 50.

Figure 5:
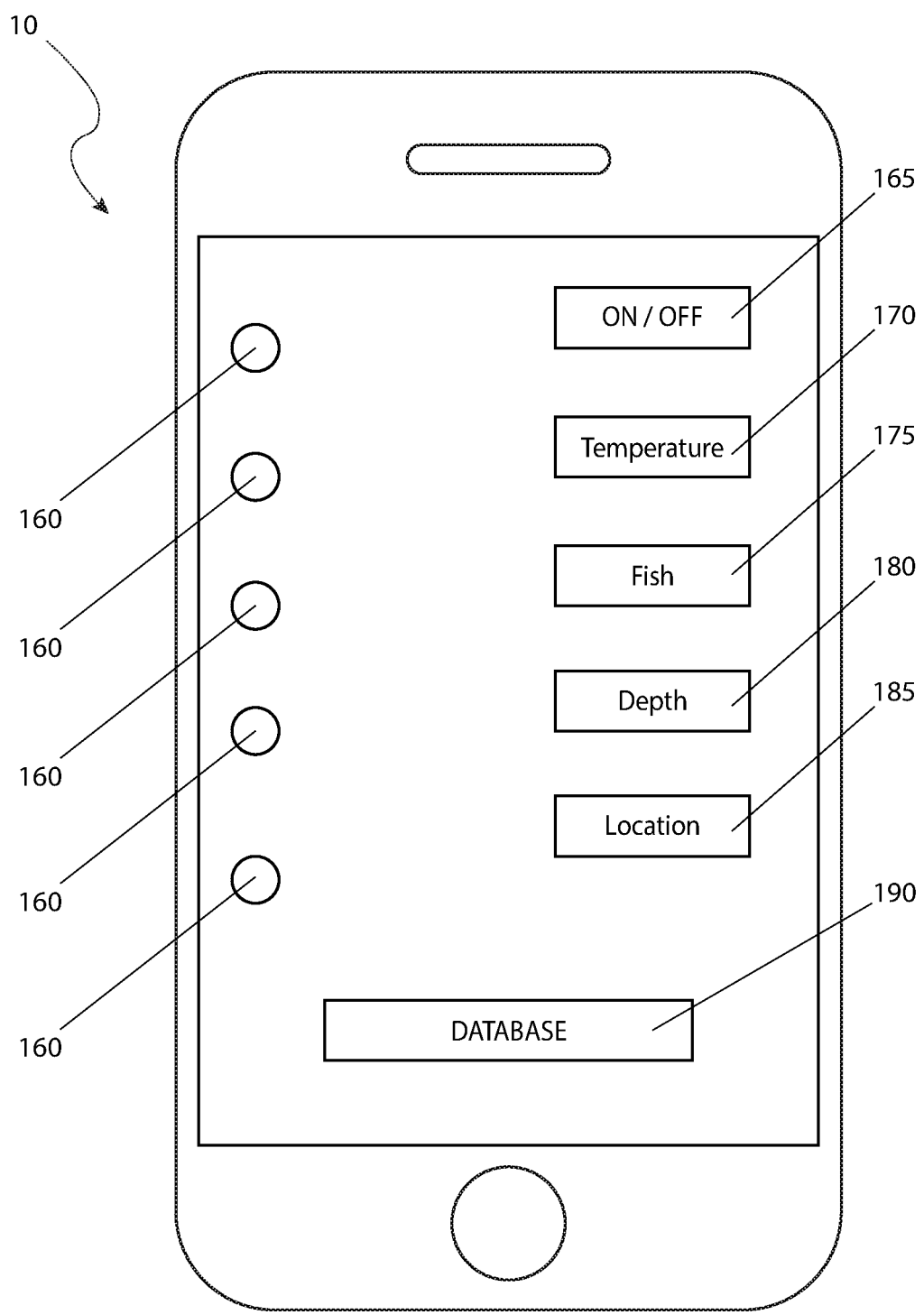
FIG. 5 is a screen capture of a smart phone application as used with the automated fishing device 10, according to the preferred embodiment of the present invention.

Referring to FIG. 5, a screen capture of a smart phone application as used with the device 10, according to the preferred embodiment of the present invention is depicted. It is noted that the screen capture as depicted is representative only for purposes of illustration, and a virtually unlimited number of depictions are possible. As such, the depiction of the screen shot as shown in FIG. 5, is not intended to be a limiting factor of the present invention. A set of five (5) strike hit icons 160 are provided, which indicate an active strike on the automated fishing assemblies 125 (as shown in FIGS. 3 and 4). A light control button 165 allows for the light strips 115 (as shown in FIGS. 3 and 4) to be toggled on and off. A temperature control readout 170 allows the user 95 (as shown in FIG. 2) to be seen at all times. A fish selection icon 175 allows the user 95 to log the type of fish that was caught on the respective automated fishing assemblies 125. A depth selection icon 180 allows the user 95 to log the depth the respective fish was caught. A location selection icon 185 allows the user 95 to log the location the respective fish was caught by linking to a GPS application on the personal transceiver 90. A database read/write icon 190 allows the user 95 to review all previous fish that have been caught by the device 10 with regard to location, depth, fish type, temperature and the like for increased chances of success in the future.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as sporting goods stores, hunting and fishing stores, mail order and internet supply houses and the like.

After procurement and prior to utilization, each of the devices 10 would be prepared in the following manner: the user 95 would install up to five (5) automated fishing assemblies 125 from each of the five (5) attachment points 55; charge or install a battery 145 in the electronics enclosure 45; place a fishing hook 130 and/or bait 135 on each fishing line 140; and link the respective device 10 to the personal transceiver 90 by scanning of the bar code 120. Multiple devices 10 would be prepared in the same manner.

During utilization of the device 10, the following procedure would be initiated: the user 95 would attach the tether 60 to a fixed point 70 and deploy the device 10 on the body of water 65; when one (1) or more of the automated fishing assemblies 125 detects a fish strike, an electrical signal is generated to the single board computer (SBC) 150 which is reported via the RF transceiver 155 along with the water temperature as detected to the personal transceiver 90 via a first radio frequency signal 75, a central station 80, and a second radio frequency signal 85; the user 95 would then retrieve the device 10 using the tether 60 and log the type of fish, the type of bait 135, the depth at which the fish was caught, as well as the location if desired. At this point in time, the bait 135 on the respective fishing hook 130 may be replaced and the device 10 redeployed. Such a process would be repeated for each of the devices 10 that are deployed.

After use of the device 10, any remaining bait 135 is removed and the device 10 is rinsed off and stored for future use in a repeating and cyclical manner. Additionally, the light strips 115 can be activated as mentioned above by an on-board light sensor 47 located on the electronics enclosure 45, which, upon sensing of dimmed ambient light at a pre-determined level, will activate the light strips 115. Other embodiments can provide for a timer that activates the light strips 115, or a manual switch.

It is noted that usage of the device 10 provides the following benefits over conventional methods of fishing: allowing families to share time and have fun together; provide children with an improved chance of success when fishing by education; allowing children to spend quality time outdoors; allowing children to get excited about fishing; allowing user 95 to perform other tasks at campsite 100; and allowing catching multiple fish at a single time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An automated fishing device, comprising:
   a base frame provided with a plurality of floatation material;
   a pair of vertical supports attached to the base frame;
   a connecting top member having a fitting;
   a plurality of pendant poles affixed to a midpoint of the connecting top member;
   an electronics enclosure having an antenna, the electronics enclosure is mounted on the connecting top member and collects various operating parameters of the automated fishing device along with usage control and through the antenna transmits a first radio frequency signal to a central station, the central station then re-transmits a unit of information via a second radio frequency signal to a personal transceiver held by a user;
   a set of four attachment points provided at a distal end of each of the pendant poles with an additional attachment point located at a midpoint of a six-way connector, the attachment points are used to support one or more automated fishing device assemblies;
   a tether provided to aid in securing the automated fishing device to a fixed point while in use, the tether is fastened to the fixed point to prevent the automated fishing device from getting lost;
   a plurality of wiring is connected to the electronics enclosure for recording the temperature of a body of water;
   a pair of sections of light strips located on the bottom of the connecting top member and are electrically powered and controlled by the electronics enclosure;
   a wiring jumper providing electrical power around a middle attachment point; and
   a light sensor sensing a change of available light envisioned to activate the light strips, the change of available light is due to ambient conditions.

2. The automated fishing device according to claim 1, wherein the floatation material is a closed cell foam device.

3. The automated fishing device according to claim 1, wherein the pendant poles affixed with the six-way connector.

4. The automated fishing device according to claim 1, wherein there are 4 pendant poles.

5. The automated fishing device according to claim 1, wherein the base frame, the pair of vertical supports, the connecting top member, and the pendant poles are made of polyvinyl chloride.

6. The automated fishing device according to claim 1, wherein the central station is a cellular telephone tower.

7. The automated fishing device according to claim 1, wherein the electronics enclosure is provided with a bar code for initial programming or pairing with the personal transceiver.

8. The automated fishing device according to claim 1, wherein the electronics enclosure houses a battery, a single board computer, and a RF transceiver.

9. The automated fishing device according to claim 8, wherein the battery is user replaceable or rechargeable.

10. The automated fishing device according to claim 1, wherein the single board computer accepts various inputs from up to five automated fishing assemblies and a temperature probe.

11. The automated fishing device according to claim 1, wherein the single board computer provides an output to the light strips through the wiring jumper.

12. The automated fishing device according to claim 1, wherein the RF transceiver serves as both an input device and an output device for the single board computer, where the inputs would be one or more signals to turn the light strips on and off, while the outputs would include one or more signals from the temperature probe and the automated fishing assemblies that would be passed back to the personal transceiver.

13. The automated fishing device according to claim 1, wherein each of the automated fishing device assemblies are baited with one or more fishing hooks or one or more bait.

14. The automated fishing device according to claim 13, wherein the one or more fishing hooks are set at a different depth or a same depth within the body of water depending on the amount of fishing line that is deployed.

15. The automated fishing device according to claim 1, wherein the tether is made of a polypropylene material that floats and is also lightweight and will not hinder natural movement of the automated fishing device.

16. The automated fishing device according to claim 1, wherein the light strips are one or more LED-type light strips that are capable of adhesive bonding to the connecting top member.

17. The automated fishing device according to claim 16, wherein the one or more LED-type light strips are waterproof.

18. The automated fishing device according to claim 1, further comprising a smart phone application used with the automated fishing device.

19. The automated fishing device according to claim 18, wherein the smart phone application includes a set of five strike hit icons which indicate an active strike on the automated fishing assemblies.

* * * * *